United States Patent [19]
Ackermann

[11] Patent Number: 5,994,809
[45] Date of Patent: Nov. 30, 1999

[54] MAGNETIC DRIVE ARRANGEMENT

[75] Inventor: Bernd Ackermann, Aachen, Germany

[73] Assignee: U.S. Philips Corporation, New York, N.Y.

[21] Appl. No.: 08/990,927

[22] Filed: Dec. 15, 1997

[30] Foreign Application Priority Data

Dec. 17, 1996 [DE] Germany .......................... 196 52 490

[51] Int. Cl.⁶ .............................. H02K 7/10; H02K 49/00
[52] U.S. Cl. ........................ 310/103; 310/75 D; 310/112
[58] Field of Search ..................................... 310/216, 261, 310/156, 187, 217, 49 R, 112, 114

[56] References Cited

U.S. PATENT DOCUMENTS

| | | | |
|---|---|---|---|
| 5,194,775 | 3/1993 | Cooper .................................... | 310/260 |
| 5,378,953 | 1/1995 | Uchida et al. ........................... | 310/156 |
| 5,532,531 | 7/1996 | Sakamoto ............................... | 310/49 R |
| 5,760,520 | 6/1998 | Hasebe et al. .......................... | 310/261 |

FOREIGN PATENT DOCUMENTS

| | | | |
|---|---|---|---|
| 0669700A1 | 8/1995 | European Pat. Off. ....... | H02K 49/10 |
| 4223815 | 1/1994 | Germany . | |
| 59153459 | 9/1984 | Japan . | |

*Primary Examiner*—Nestor Ramirez
*Assistant Examiner*—Tran N Nguyen
*Attorney, Agent, or Firm*—E. Brice Faller

[57] ABSTRACT

Three magnetically cooperating parts are movable relative to one another, one part being provided for connection to a drive shaft, one part being provided for connection to an output shaft, and one part being provided as a stationary part. A first part surrounds a second part, these parts having permanent magnets which alternately exhibit north poles and south poles along the circumference. The third part comprises a yoke surrounding the first part, which yoke serves as a magnetic return element, and which has magnetically conductive teeth at the inner side of the yoke.

6 Claims, 3 Drawing Sheets

MAGNETIC DRIVE ARRANGEMENT

BACKGROUND OF THE INVENTION

The invention relates to a magnetic drive arrangement comprising at least three magnetically cooperating parts which are movable relative to one another, one part being provided for connection to a drive shaft, one part being provided for connection to an output shaft, and one part being provided as a stationary part, a first and a second part comprising permanent magnets which alternately exhibit north poles and south poles along the circumference, a third part having teeth of a magnetically conductive material for modulating the magnetic fields generated by the permanent magnets.

A magnetic drive arrangement of the type defined in the opening paragraph is known from EP 669 700, to which U.S. Pat. No. 5,633,555 corresponds. In this known drive arrangement the toothed third part is interposed as a central part between the first part and the second part. The individual teeth of this third part are interconnected by portions that must be very thin because otherwise they will short-circuit the magnetic flux generated by the magnet poles of the second part. The portions between the teeth of the third part are highly saturated in operation.

As a result of the requirement that the portions between the teeth of the third part must be thin, the third part can only be manufactured with a limited mechanical stability. This is a substantial drawback, particularly in the case of magnetic drive arrangements which serve to transmit larger torques.

SUMMARY OF THE INVENTION

It is an object of the present invention to provide a magnetic drive arrangement of the type defined in the opening paragraph, which has a higher mechanical stability while it is capable of transmitting substantially the same torque, and which is simple from the point of view of production engineering.

According to the invention the third part comprises a yoke, which is closed in itself, which serves as a magnetic return element, and which has magnetically conductive teeth at the inner side of the yoke, and the third part surrounds the first and the second part.

According to the invention the third part is arranged as the outer part of the magnetic drive arrangement. At its outer side the third part comprises a magnetically conductive cylindrical yoke, which is closed in itself and which serves as a magnetic return element for the magnetic flux excited by the permanent magnets of the first and the second part. The cross-section of this yoke should be selected so large that in operation the magnetic material of this yoke is saturated only to such an extent that the torque transmitted by the magnetic drive arrangement is not reduced impermissibly. At the inner side of the yoke $Z_1$ magnetically conductive teeth are disposed. These magnetically conductive inwardly projecting teeth modulate the magnetic fields generated by the permanent magnets of the first part and the second part, as a result of which forces and torques are produced in conjunction with the permanent magnets of the first part and the second part.

This construction has the advantage that the cross-section of the yoke can be selected to be as large as is necessary from a mechanical point of view, without the operation of the magnetic drive arrangement being adversely affected.

An advantageous embodiment of the invention is characterized in that the first part has $p_1$ pairs of north and south poles, the second part has $p_1$ pairs of north and south poles, $p_2 < p_1$, and the first part having the larger number of poles being interposed as a central part between the third and the second part.

The magnetic field generated by the second part having the smaller number of poles is modulated by means of the teeth of the third part. This modulated magnetic field then cooperates with the permanent magnets of the first part, which align themselves in accordance with the modulated magnetic field. The field-modulating action of the teeth is particularly prominent at the air gap directly adjoining the third part. It is therefore favorable to interpose the first part having the larger number of poles, which should align itself in accordance with the modulated magnetic field, as a central part between the first and the second part. As a result of this, the magnetic interaction between the modulated magnetic field of the second part and the permanent magnets of the first part is particularly effective. Thus, it is possible to transmit larger torques.

A further advantageous embodiment of the invention is characterized in that the pairs of north and south poles are uniformly spaced along the circumference of the first and the second part, the teeth on the third part are uniformly spaced along the circumference, and the first part has $p_1 = Z_1 \pm N$ pairs of north and south poles, where N is an integer, N=1, 2, 3 . . ., and the second part has $p_2 = N$ pairs of north and south poles.

A uniformly spaced arrangement of the pairs of north and south poles along the circumference is to be understood to mean that the pole width of all the poles is the same and that the individual poles are spaced equidistantly relative to one another. A uniformly spaced arrangement of the teeth is to be understood to mean that the circumferential width of all the teeth is the same and that the individual teeth are spaced equidistantly relative to one another.

The first part has $p_1 = Z_1 \pm N$ pairs of north and south poles, where N is an integer, and the second part has $p_2 = N$ pairs of north and south poles. A possible combination is for example $Z_1 = 9$, $p_1 = 10$ and $p_2 = 1$. In that case N=1.

Such a construction results in a highly uniform torque.

A further advantageous embodiment of the invention is characterized in that the pairs of north and south poles are disposed uniformly and without pole gaps along the circumference of the first and the second part, in such a manner that the first and the second part exhibit cylindrical surfaces.

With this configuration the reluctance of the air gap between the first part and the second part of the magnetic drive arrangement is always constant for all angular positions of the individual parts. As a result of this, the uniformity of the torque is increased even further.

A further advantageous embodiment of the invention is characterized in that the first, the second and the third part are concentric with one another.

This results in a maximal magnetic linkage among the parts along the entire circumference.

A further advantageous embodiment of the invention is characterized in that the third part is constructed as an integral part.

This is very favorable from the point of view of production engineering.

A further advantageous embodiment of the invention is characterized in that the central part, interposed between the third and the second part, or between the third and the first part, is stationary.

The central part can then form part of a partition for transmitting a torque, for example, into a vacuum. In addition to the driving function this yields the function of a magnetic coupling. In the case of a conventional magnetic coupling the partition attenuates the magnetic coupling forces, wile in the present case the partition actively contributes to the coupling.

A further advantageous embodiment of the invention is characterized in that the magnetic fields in the air gaps between the individual parts extend substantially radially.

As a result of this, the forces acting on the individual parts largely compensate for one another.

Preferably, the magnetic drive arrangement in accordance with the invention is used in an electrical domestic appliance.

The low noise level produced by the magnetic drive arrangement is then particularly advantageous.

DETAILED DESCRIPTION OF THE PREFERRED EMBODIMENTS

Figure 1:
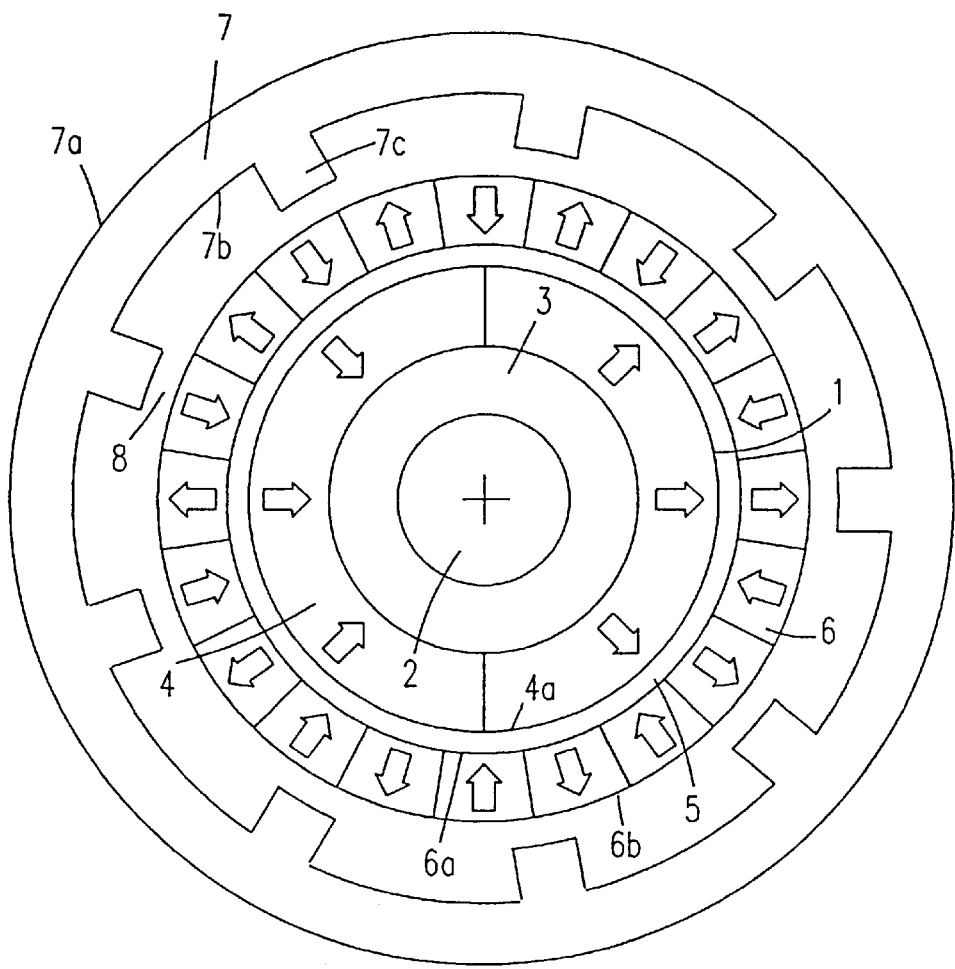
FIG. 1 is a diagrammatic view of a magnetic drive arrangement comprising three magnetically cooperating parts which are movable relative to one another, wherein the first and the second part are enclosed by a magnetically passive third part which serves as a magnetic return element and has magnetically conduct teeth on its inner side, which teeth modulate the magnetic fields generated by the permanent magnets.
Figures 2A, 2B, 2C:
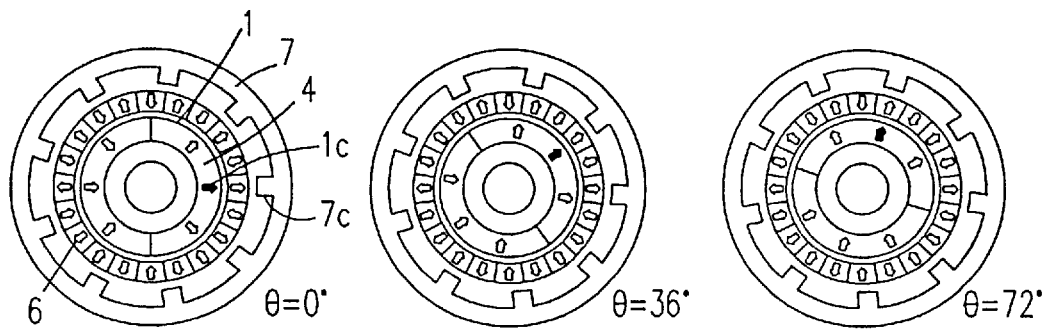
FIGS. 2a to 2k illustrate the cycles of movement of the magnetic drive arrangement of FIG. 1, the inner second part being rotated by a drive shaft, the central first part being stationary, and the outer third part being connected to an output shaft.
Figures 2D, 2E, 2F:
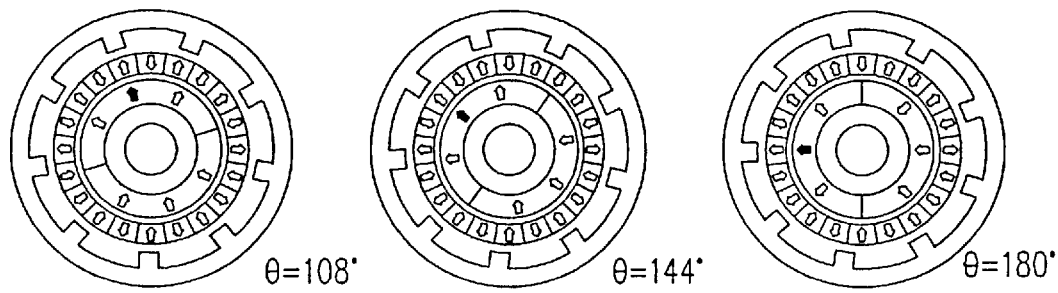
Figures 2G, 2H, 2I:
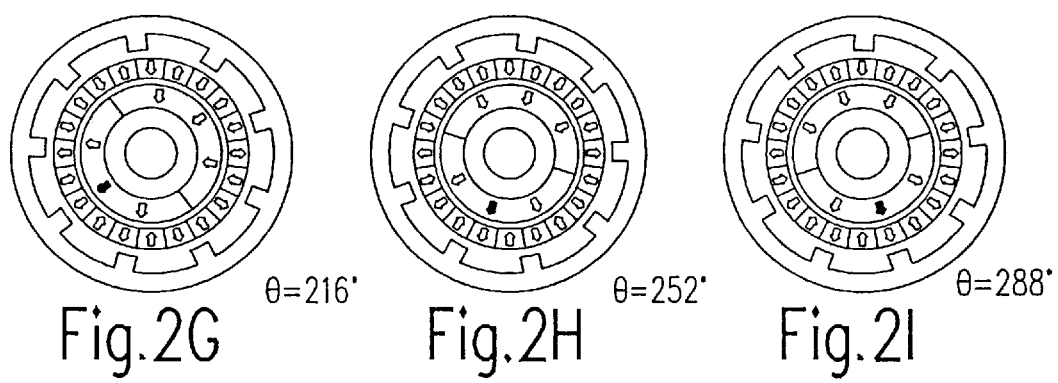
Figures 2J, 2K:
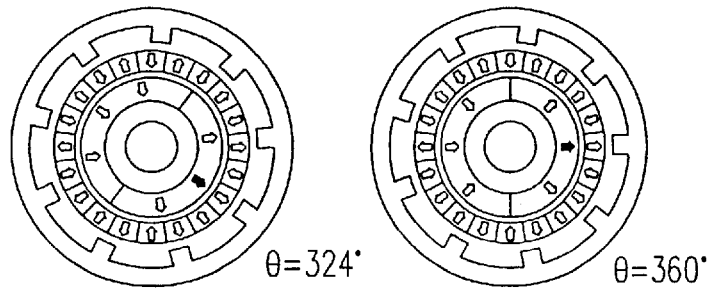
Figures 3A, 3B, 3C:
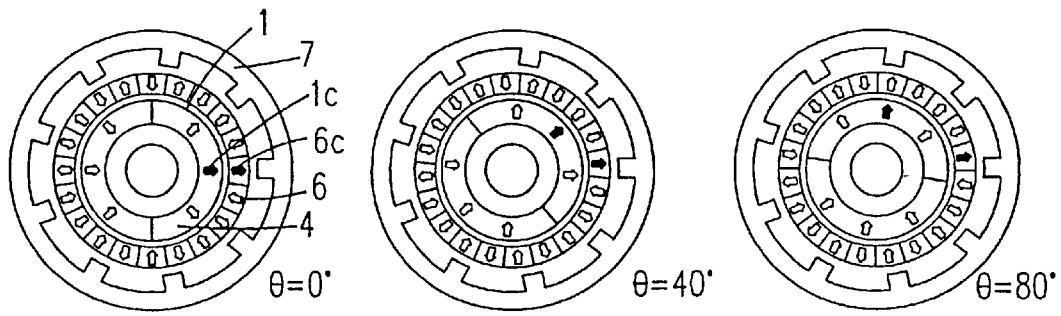
FIGS. 3a to 3j illustrate the cycles of movement of the magnetic drive arrangement of FIG. 1, the inner second being rotated by a drive shaft, the central first part being connected to an output shaft, and the outer third part being stationary.
Figures 3D, 3E, 3F:
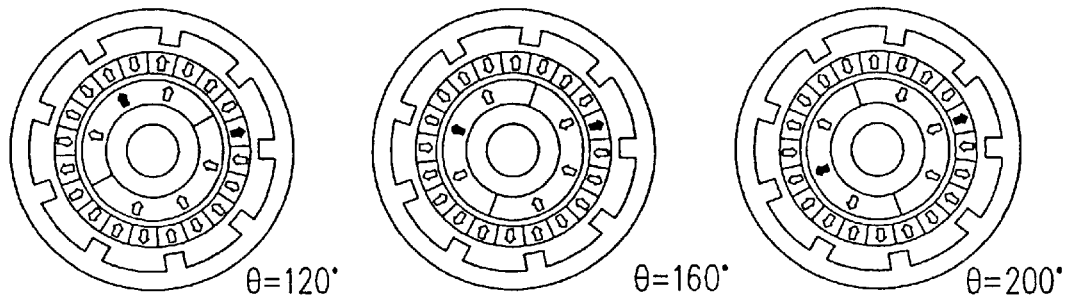
Figures 3G, 3H, 3I:
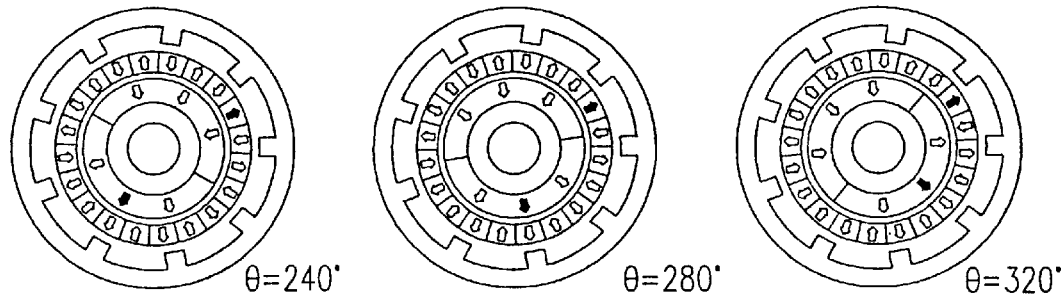
Figure 3J:
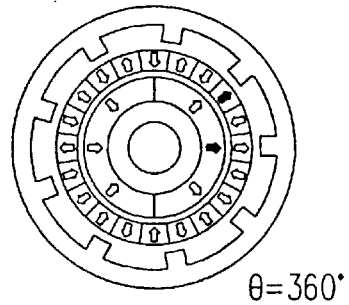

FIG. 1 shows a magnetic drive arrangement having a second part formed by a rotor 1 comprising an iron ring 3 mounted on a shaft 2. The iron ring 3 carries a second permanent magnet ring 4 with the pole number $p_2=1$. The first part is a first permanent-magnet ring 6, which surrounds the rotor 1 concentrically and thereby defines an air gap 5. The first permanent-magnet ring 6 has $p_1=10$ pairs of north and south poles. The surface 4a of the first permanent-magnet ring 4 as well as both surfaces 6a and 6b of the second permanent-magnet ring 6 are smooth cylindrical surfaces. The third part is an iron part 7 which concentrically surrounds the rotor 1 and the permanent-magnet ring 6 and thereby forms a second air gap 8. The iron part 7 consists of an iron yoke 7a having $Z_1=9$ iron teeth 7b at its inner side.

The iron ring 7a acts as a magnetic return element for the magnetic flux produced by the permanent-magnet ring 4 and the permanent-magnet ring 6. The cross-section of this iron yoke 7a is selected to be so large that the magnetic material of this yoke 7a is not saturated in operation.

The operation of the magnetic drive arrangement can be illustrated as follows. The magnetic field generated by the first permanent-magnet ring 4 is modulated by means of the teeth 7c of the iron part 7. This modulated magnetic field, which is active in the second air gap 8, then cooperates with the first permanent-magnet ring 6, whose magnet poles orient themselves in accordance with the modulated magnetic field.

FIGS. 2a to 2k illustrate the cycles of movement of the magnetic drive arrangement of FIG. 1 when the first permanent-magnet ring 6 is stationary. The rotor 1 is rotated counter-clockwise by the drive shaft 2 and transmits a torque to the iron part 7 coupled to an output shaft. In the situation illustrated in FIG. 1 no external forces act upon the iron part 7. In the situation of FIG. 2 the rotation of the rotor 1 is shown in steps of 36°. To illustrate the operation one of the arrows 1c on the rotor 1 has been darkened, which arrows indicate the local direction of magnetization of the permanent magnets of the second permanent-magnet ring 4. Likewise, one of the teeth 7c on the iron part 7 has been darkened.

FIG. 2 illustrates the operation of the drive arrangement, the iron part 7 being rotated clockwise through 40° when the rotor 1 is rotated 360° in the counter-clockwise direction.

FIGS. 3a to 3j illustrate the cycles of movement of the magnetic drive arrangement of FIG. 1 when the iron part is stationary. The rotor 1 is rotated clockwise by the drive shaft 2 and transmits a torque to the first permanent-magnet ring 6, which is coupled to an output shaft. In the situation shown in FIG. 3 no external forces act on the permanent-magnet ring 6.

In the situation of FIG. 3 the rotor 1 is rotated in steps of 40°. To illustrate the operation one of the arrows 1c on the rotor 1, which indicate the local direction of magnetization of the permanent magnets of the second permanent-magnet ring 4, has been darkened. Likewise, one of the arrows 6c on the second permanent-magnet ring 6, which indicate the local direction of magnetization of the permanent magnets of the first permanent-magnet ring 6, has been darkened.

FIG. 3 illustrates the operation of the drive arrangement, the permanent-magnet ring 6 being rotated counter-clockwise through 36° when the rotor 1 is rotated 360° in the counter-clockwise direction.

I claim:

1. A magnetic drive arrangement comprising a second part having a circumference with $p_2$ pairs of permanent magnets with alternating radially oriented north and south poles, a first part surrounding said second part and having $p_1$ pairs of permanent magnets with alternating radially oriented north and south poles separated from said poles of said second part by a first air gap, wherein $p_1$ and $p_2$ are integers and $p_1 > p_2$, and a third part comprising a magnetic yoke surrounding said first part and separated therefrom by a second air gap, said third part having a plurality of magnetically conductive teeth on said yokes which teeth face said magnets of said first part.

2. A magnetic drive arrangement as in claim 1 wherein said second part is connected to a drive shaft, said first part is stationary, and said third part is connected to an output shaft.

3. A magnetic drive arrangement as in claim 1 wherein said permanent magnets of said first and second parts are uniformly spaced without pole gaps, whereby the permanent magnets of each part form a cylindrical surface.

4. A magnetic drive arrangement as in claim 1 wherein said first, second, and third parts are concentric to each other.

5. A magnetic drive arrangement as in claim 1 wherein said third part is constructed as an integral part.

6. A magnetic drive arrangement as in claim 1 wherein magnetic fields extend radially in said first and second air gaps.

* * * * *